United States Patent [19]

Todd

[11] Patent Number: 4,620,063

[45] Date of Patent: Oct. 28, 1986

[54] RING SIGNAL DETECTOR

[76] Inventor: Leonard M. Todd, 424 W. 119th St., New York, N.Y. 10027

[21] Appl. No.: 691,555

[22] Filed: Jan. 15, 1984

Related U.S. Application Data

[63] Continuation of Ser. No. 959,078, Nov. 9, 1978, abandoned, which is a continuation of Ser. No. 464,626, Apr. 26, 1974, Pat. No. 4,508,466, which is a continuation-in-part of Ser. No. 88,909, Nov. 12, 1970, abandoned.

[51] Int. Cl.⁴ .............................................. H04M 1/65
[52] U.S. Cl. ...................................... 179/2 A; 179/6.16
[58] Field of Search ................. 179/2 A, 2 C, 2 DP, 179/18 PE, 18 HB, 84 R, 84 L, 84 SS, 81 R, 81 B, 6.13, 6.16

[56] References Cited

U.S. PATENT DOCUMENTS

| | | | |
|---|---|---|---|
| 3,405,234 | 10/1968 | West | 179/2 A |
| 3,539,728 | 11/1970 | Rubenstein | 179/613 |
| 3,548,102 | 12/1970 | Schaum et al. | 179/2 A |

*Primary Examiner*—James L. Dwyer

[57] ABSTRACT

A ring detector employs a d.c. blocking capacitor in series reactively with the telephone line, a control element and another terminal of a semiconductor, applying ring voltage and causing conduction, oscillation or latching in the semiconductor. A resistor, transformer, rectifier, a second charging capacitor or all of these may be placed between the capacitor and the semiconductor.

16 Claims, 9 Drawing Figures

RING SIGNAL DETECTOR

This application is a continuation of Ser. No. 959,078, filed Nov. 9, 1978, now abandoned, that is also a continuation of Ser. No. 464,626, filed Apr. 26, 1974, now U.S. Pat. No. 4,508,466, which is a continuation-in-part of pending application Ser. No. 88,909, filed Nov. 12, 1970, now abandoned, for Telephone Answering Devices, and is filed in addition, pursuant to requirements for election of species and restriction made in Ser. No. 269,270, now U.S. Pat. No. 3,794,764, that is also a continuation-in-part of Ser. No. 88,909.

BACKGROUND OF THE INVENTION

Ring detectors of the prior art generally employ a d.c. blocking capacitor in series with a relay and rectifier across the telephone line that are switched out of circuit after ring up. In a later device, the telephone line is loosely inductively coupled to a transistor that amplifies pulses produced at the start and stop of each ring burst. Another circuit couples the line through a rectifier and capacitor charging circuit to a normally on transistor to cause the transistor to cease conduction when a ring signal appears. In another device, a separate ringing line many miles long is directly connected to a transistor that amplifies a ringing voltage attenuated by the distance.

In this invention, a capacity coupled high impedance ring detector operates on low ringing power to provide a useful means for actuating equipment when a ring signal appears, with a simple semiconductor circuit that may replace relatively large and costly relays, reducing costs and conserving space.

It is another object of this invention to detect ringing voltage and by light loading of the line and lack of d.c. flow, not to interfere with telephone service, to cause low attenuation of voice signals and that need not be switched out of the telephone line after ringing is tripped and line seizure is established.

SUMMARY OF THE INVENTION

During ringing, a 90 volt, 20 Hz ringing voltage burst is applied to the telephone line superimposed on the 50 volt d.c. line voltage, for about two seconds of every six although this time and ratio vary with different central offices. PABX ringing may differ considerably and is frequently shorter. Several hundred milliwatts may be required to actuate the ringer; an additional ringer doubles the load and relays require substantial additional power generally detectable at the central office, for which an additional tariff is prescribed. In the present invention, a semiconductor coupled to the telephone line by a d.c. blocking capacitor, conducts current through a load in series with the semiconductor and a power source (or oscillates or latches), when a ringing voltage appears in the line.

In this invention, the semiconductor may be a transistor actuating a load, may be the input transistor of a bistable (latching) multivibrator, a monostable (one-shot self-commutating) multivibrator, an astable type, a Schmitt trigger (monostable, not a multivibrator) that with a charging input capacitor maintains conduction until the capacitor is discharged and like devices that actuate a load.

The load may be a relay, indicator lamp for a multi-key telephone set, the input to R-C delay means, input to multivibrators, associated apparatus such as local ringers, telephone answering equipment or actuators therefor and the like. A variety of input circuits is seen in U.S. Pat. No. 3,794,764 that employ this invention as a subcombination. Output circuits with different functions may vary greatly.

The circuits may be employed in a telephone answering set with a latching semiconductor such as an SCR that, following the appearance of a ring signal and latching of the SCR (or other latching device), lights a lamp functioning as a "call received" or "message received" indicator. Simple commutating means will turn the lamp off when the set is turned off or set for playback. This circuit is first taught in Disclosure Document No. 4925, filed Apr. 20, 1971.

The circuits may be employed to drive a counter for the number of ring bursts or for the number of AC cycles of the ringing voltage, and after a pre-set number has been received, to actuate apparatus. The fundamental circuit taught herein may actuate R-C delay circuits and then actuate a load or other apparatus.

The high impedance of the input circuit results in low attenuation of voice signals and draws only small amounts of ringing power so that the detector may be permitted to remain in circuit if desired, under a variety of conditions including dialing and talking. Prior art circuits were switched out of circuit after ring up mainly because of attenuation of voice signals. While relays may require 100 milliwatts of ringing power, circuits of this invention operate well with microwatts of ringing input and even this may be reduced.

Following the d.c. blocking capacitor, a transformer may be added that reduces ring voltage and may provide an impedance match from telephone line to semiconductor input and may be used to isolate the detector from the line. Two blocking capacitors may likewise isolate the detector, should this be desired.

A rectifier, single, full-wave, doubler or bridge, or the like, alone or with a charging capacitor or R-C delay element may be inserted between the blocking capacitor or blocking capacitor and transformer and the semiconductor. High impedance semiconductors such as unijunction transistors and programmable unijunction transistors are well suited to provide long delays. A resistor in the input circuit may be used to increase input impedance.

In one arrangement, the semiconductor is a thyristor which latches on receipt of a ring signal, energizes a relay, establishes line seizure and actuates associated apparatus until commutated. The thyristor or latching semiconductor may be used for actuating devices without establishing line seizure. Similar to this is a thyristor with a load in series across an AC power source, with the telephone line coupled similarly to the thyristor input, that conducts when a rectified ring signal is applied to its gate with respect to cathode and ceases conduction when the ring signal stops. In a self-commutating circuit employing similar principles, a ring signal is applied to the base-emitter junction of a transistor. Other circuits may include a unijunction transistor or "trigger devices" such as PUT's, negative resistance semiconductors and relaxation oscillators, causing the semiconductor to be actuated, to conduct, oscillate or latch while the ring signal continues and current to flow from a d.c. source through a load in a series circuit.

Various arrangements of the input circuit are taught including rectification of the ring signal and addition of a charging capacitor that reduces transient response, smooths the 20 Hz rectified ringing pulses and can yield a time delay.

DETAILED DESCRIPTION

Figure 1:
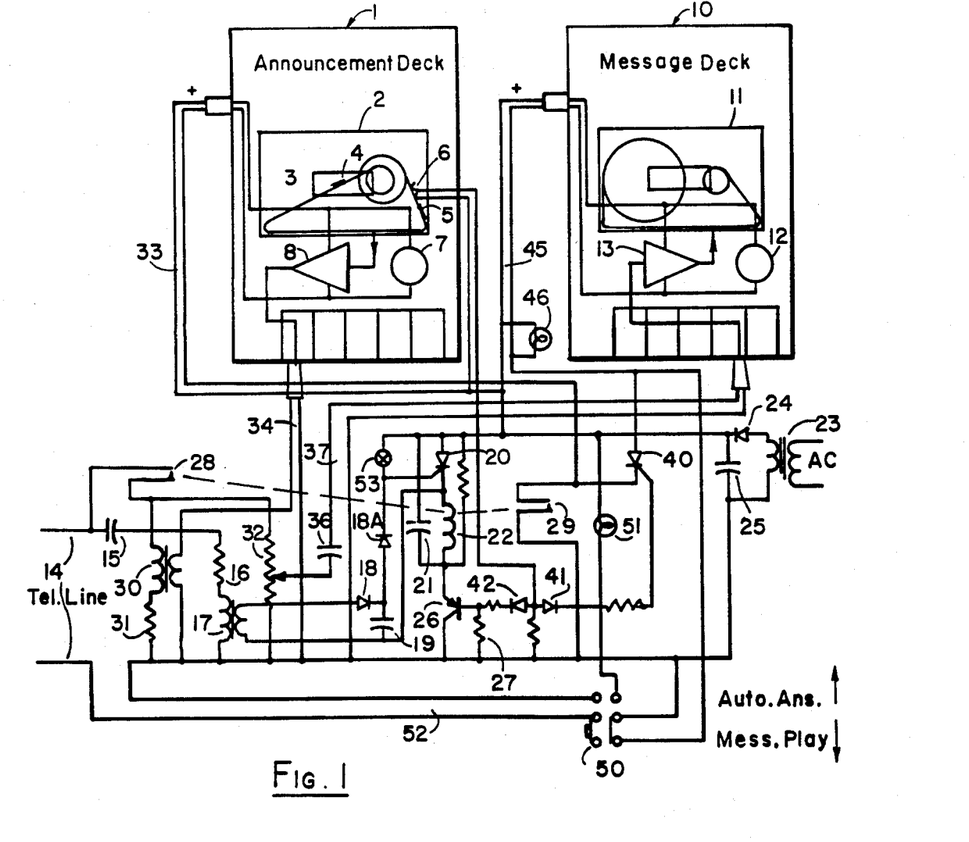
FIG. 1 is the basic circuit applying attenuated, rectified ringing voltage to the gate and cathode of a latching thyristor that is commutated by a series transistor.

FIG. 1 exemplifies the invention. Ringing voltage in telephone line 14 is coupled by d.c. blocking capacitor 15 to the control element of semiconductor 20 to cause latching. The ringing voltage may cause oscillation or conduction in other circuits and time delay may be added before the control element, for example by the addition of a rectifier and R-C circuit as in FIGS. 1-3, 6-9, or time delay may be added in the output of the semiconductor as a thermal delay switch, FIG. 9 or R-C network in FIG. 5 or counters or other circuits may be added.

Resistor 16 increases the impedance of the input circuit where desired and since its impedance does not vary with frequency, better serves such an increase than a reduction in value of capacitor 15 that has one third of the reactance at 60 Hz that at 20 Hz ringing frequency, thus increasing the sensitivity of the circuit to 60 Hz power line interference. In practice power line pickup is not a problem at average or usual distances from the central office and it has not been found necessary to include resonant filters, other frequency responsive circuits or very large capacitors 15 to reduce the effects of pickup.

Ringing voltage in telephone line 14 is coupled by capacitor 15 resistor 16 and primary of transformer 17 to secondary of transformer 17 diode 18 time delay capacitor 19 and diode 18A to the gate of SCR 20 causing the SCR to latch on with current supplied from transformer 23 diode 24 and capacitor 25. When voltage at the gate of SCR 20 reaches (say) 0.4 volts d.c. with respect to cathode, the SCR fires and gate voltage rises to near anode voltage. Diode 18A prevents capacitor 19 from charging from the gate of SCR 20 which otherwise would interfere with commutation.

Current flows through relay coil 22 and transistor 26 held normally on by resistor 27. Relay contacts 28-29 close. Network 15-17 together with the low gate triggering power requirement of SCR 20 presents a high impedance to telephone line 14. This impedance may readily be greatly higher than capacitor, rectifier relay circuits of the prior art, wherein relays require in the order of 100 milliwatts to operate and are usually switched out of circuit after ring up. An SCR will fire with 100 microwatts or less.

At the conclusion of the announcement-message cycle, sensing tape 5 crosses sensing tape switch 6 sending a long impulse through diode 42 to the base of transistor 26 causing it to cease conduction for the duration of the long impulse. Current then flows from capacitor 21 through SCR 20 and relay coil 22, and resistor in parallel. In the time required for the capacitor to discharge, which is determined by its value, say 0.3 seconds, relay 22 opens releasing contacts 28-29 and current falls below the holding level of SCR 20 causing it to unlatch, restoring the detector to standby. With the use of a single short length of sensing tape (for example without mid-cycle shift), capacitor 21 may be eliminated. Other commutation methods may be used.

Figure 2:
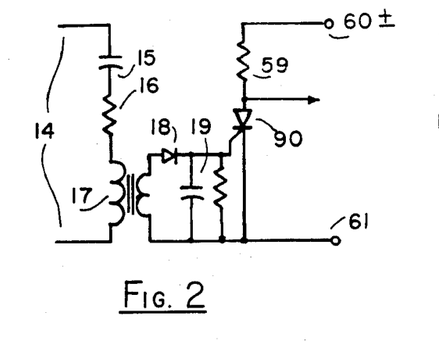
FIG. 2 is similar to FIG. 1 with a load in series with the thyristor across a commutating AC supply.

In FIG. 2 SCR 90 is supplied with AC from lines 60-61 and is commutated by the negative swings of the AC supply. A ring signal appearing in line 14 is transformed, rectified and applied to gate-cathode of SCR 90 causing it to conduct and actuate load 59 with half wave rectified AC which may be a substantial load such as a thermal delay switch (see FIG. 9). Line impedance and power requirement for the gate are similar to FIG. 1. A transistor substituted in this circuit with d.c. supply requires no commutation. (See FIG. 3). This circuit is discussed in Disclosure Document No. 3814 filed Dec. 28, 1970.

Figure 3:
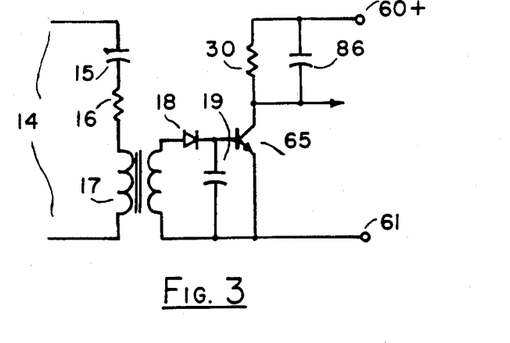
FIG. 3 uses a similar input circuit employing a transistor in series with a load across a d.c. supply.
Figure 4:
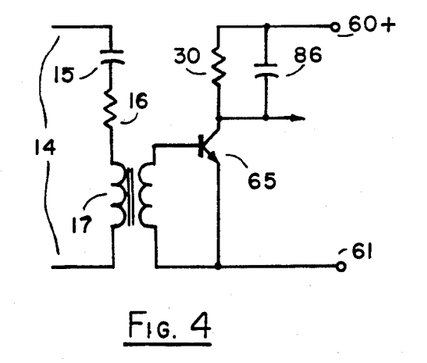
FIG. 4 employs a simplified input circuit applied to FIG. 3.

The circuit of FIG. 3 differs from FIG. 2 by replacing thyristor 90 with transistor 65 as the control device, that turns power from 60-61 on in load impedance 30 when a ring signal appears and stops power flow when the ring signal stops. Capacitor 86 will aid in smoothing 20 Hz d.c. pulses across load 30. This circuit and the circuit of FIG. 4 are described in U.S. Pat. No. 3,794,764, and are combinations of principles taught in FIGS. 2 and 5 herein.

In FIG. 4 unrectified, transformed ringing AC voltage is applied to the base-emitter junction of transistor 65 to cause conduction. This circuit behaves very efficiently and is similar to FIG. 3 with the exception of lack of delay in the input and has reduced component count. This is described in U.S. Pat. No. 3,794,764.

Figure 5:
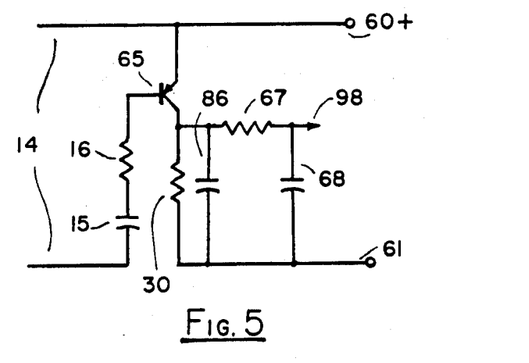
FIG. 5 is a transistor ring detector with reduced component count.

In FIG. 5 capacitor 15 and resistor 16 attenuate and apply AC ringing voltage to the base-emitter junction of transistor 65 eliminating transformer 17. As noted, a second capacitor similar to capacitor 15 may be inserted in the opposite side of line 14 to the emitter of transistor 65 to isolate the detector from line 14 where this is desired or essential. The component count and relative cost of this circuit is very small compared with prior art devices and is highly useful and efficient. The output circuit is power source 60-61 and load impedance 30. Time delay in the output may be readily provided by R-C network 86,67-68 or other arrangements. This circuit is described in U.S. Pat. No. 3,794,764 and in Disclosure Document No. 6590 Sept. 7, 1971. By reversing the polarity of 60-61 an NPN transistor may be used instead of the PNP unit shown.

Figure 6:
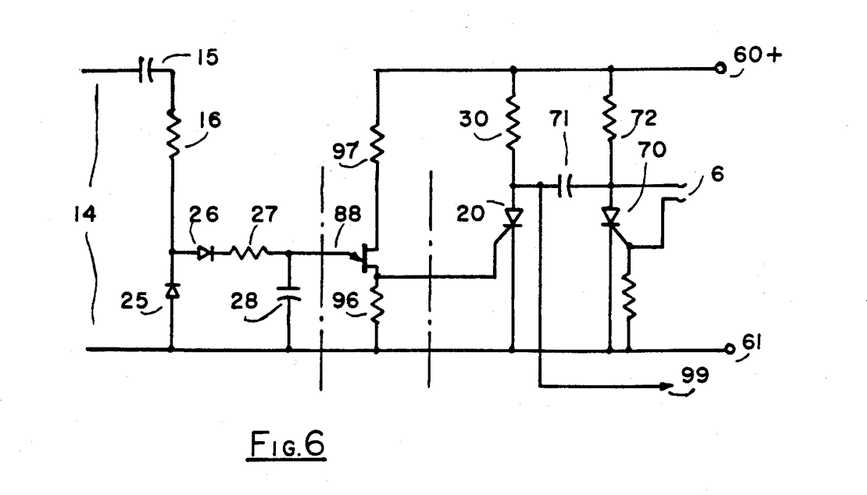
FIG. 6 is a circuit employing a capacity coupled rectifier wherein the ring voltage charges a second capacitor to fire a unijunction transistor.

The input circuit of FIG. 6 employs a capacitor-rectifier-R-C delay network 14-16, 25-28 to couple and attenuate ringing voltage from telephone line 14 to the emitter-base junction of UJT 88 which conducts after a delay when emitter peak point voltage is reached. UJT 88 then fires periodically until the ringing stops and the output pulses may be used for example, to fire SCR 20 to operate a second load impedance 30. Commutation is obtained in tbhis instance by discharging capacitor 71 across SCR 20, first firing SCR 70 with an impulse given to contacts 6. The input rectifier may be a bridge arrangement or single rectifier as in FIG. 7. This circuit is taught in Disclosure Document No. 120 filed June 17, 1969 and in Disclosure Document No. 3814 filed Dec. 28, 1970. A capacitor-transformer input circuit may be employed, provides isolation from the telephone line as in FIGS. 1–4 and operation is similar.

Figure 7:
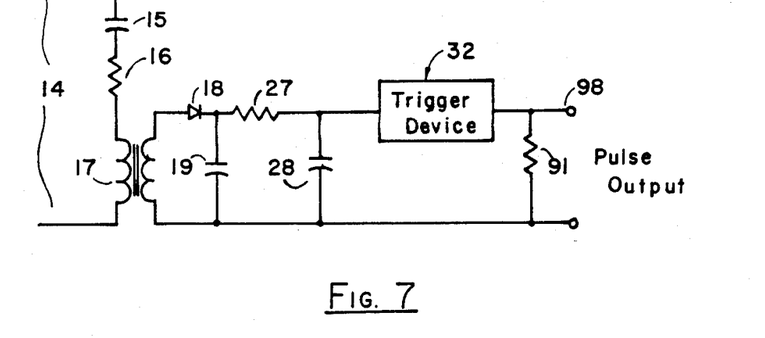
FIG. 7 is a generalized diagram of a circuit coupled to the telephone line by a capacitor producing pulses after a delay.

FIG. 7 shows a typical input circuit 14–19 as taught above, feeding a generalized relaxation oscillator circuit conventionally used for analysis of the operation of such circuits, employing a negative resistance characteristic of the trigger device 32, that after voltage across capacitor 28 exceeds a switching or trigger voltage, discharges capacitor 28 through load 98. Other trigger devices besides unijunction transistors include programmable unijunction transistors, disc trigger diodes, silicon unilateral and bilateral switches, neon glow lamps and the like. The output pulses may be used to actuate transistors. Astable multivibrators and transistor blocking oscillators may likewise be used to produce pulses when triggered by a ring detector as taught herein.

Figure 8:
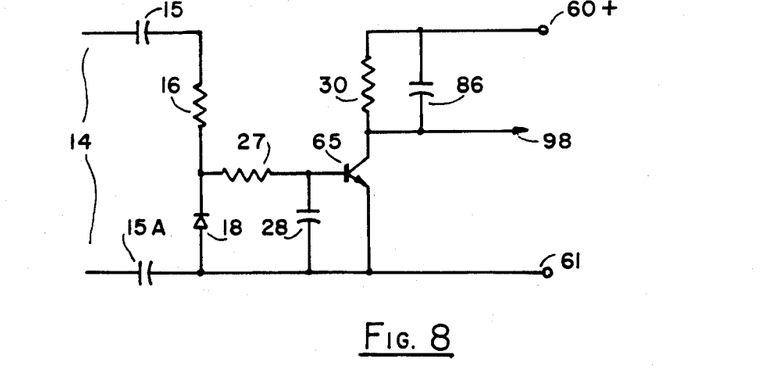
FIG. 8 is the circuit of a capacity coupled rectifier charging a second capacitor to actuate a transistor.

In FIG. 8 the component count of the input circuit of FIG. 6 is reduced by removing diode 26 with a small reduction in efficiency that is not of major importance. Following a time delay after a ringing voltage appears, capacitor 28 charges and reaches a voltage applied to base-emitter junction of transistor 65 that conducts and operates load 30 from power source 60–61. When ringing stops, conduction stops.

Figure 9:
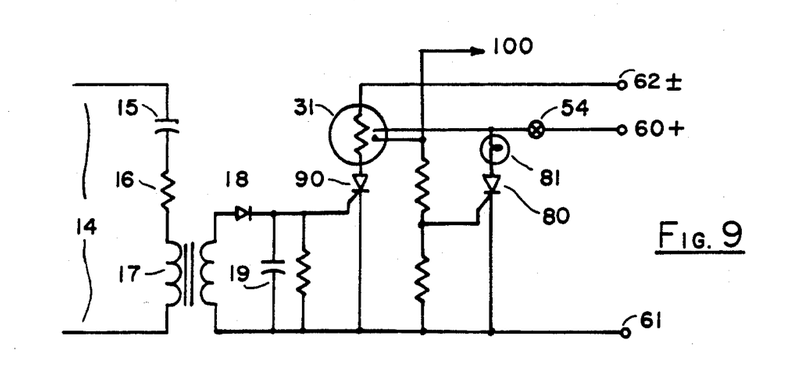
FIG. 9 is the circuit of FIG. 2 with a thermal delay switch and a second latching thyristor to light a "call received" lamp.

FIG. 9 shows the application of a latching ring detector of this invention, applied to operate a "call received" lamp; the circuit of FIG. 2 is used with load impedance 31 being a thermal delay switch that actuates associated apparatus through line 100 after a ring signal is received for a predetermined time and gives an impulse to SCR 80 causing the SCR to latch and light lamp 81 indicating that a call has been received. The lamp may be extinguished by operating normally closed momentary pushbutton switch 54 or the thyristor may be connected in a message recorder circuit that when operated for playback or merely turned off, interrupts current flow and turns the lamp off. Other commutation means may be used and considerable variation is possible. The input circuit may employ time delay which may be R-C delay means preceding or following the voltage responsive circuit. The invention resides in the use of a latching semiconductor switch as a "call received" circuit and lamp actuator, either as a part of the ring detector or coupled to the ring detector, directly, sequentially, with time delay or otherwise. This circuit is described in Disclosure Document No. 4925 filed Apr. 20, 1971.

The latching semiconductor switch may be a thyristor, transistor actuated by a bistable switch, transistor latching relay or the like.

The principles and teachings herein of high impedance in the detector are not previously taught to be applicable to prior art low impedance detectors, which may thereby remain in the line after ring up. Moreover, with the use of time delay, a conventional low impedance detector (and the detectors of this invention and other detectors) may remain in the line during manual dialing as well as responding to ringing voltage after a predetermined time.

In U.S. Pat. No. 3,226,478, a typical ring detector is shown in FIG. 1 where a capacitor is connected in series with two terminals of a bridge rectifier across the telephone line, with rectifier output feeding the relay coil. After ring up, the detector is switched out of the line. In U.S. Pat. No. 3,445,600, FIGS. 2 and 5 a relay ring detector is shown kept in the line before and during ring up and after line seizure; time delay is provided. By increasing the sensitivity and resistance of the relays in conventional capacitor-rectifier-relay ring detectors of the prior art (if desired including a series resistor and relatively low value capacitor), the ring detector input impedance may be increased to the point where voice signal attenuation is minimal and ringing power requirement is fairly small in proportion to the ringer of a conventional telephone set. Relays are available with armatures that pull in at far less than 100 milliwatt power sensitivity and may be used to secure these advantages. An AC relay without a rectifier, having high sensitivity, while not usual may be designed and applied to this circuit.

Time delay in a detector to respond to ringing after a predetermined time is well-known; however, time delay further permits the detector to remain in the line during rotary dialing, which is not hitherto taught. The voltage pulses resulting from rotary dialing are substantial, going from approximately 6 volts talking voltage to 50 volts line voltage plus transients, at about 8 to 11 pulses per second with break somewhat longer than make. This pulsing approaches a ringing voltage and actuates a ring detector without time delay. Particularly troublesome is the condition where a rapid series of figure "0"s is dialed. High impedance in the detector without delay has advantages and many applications; time delay alone without high impedance is not entirely sufficient and it is taught that both are desirable. It is accordingly taught that a high impedance blocking capacitor-relay-detector is highly useful by drawing small amounts of ringing power and causing minimal attenuation of voice signals and is more useful when time delay is added before or after the detector, permitting the detector to remain in circuit during dialing and talking. As noted, time delay prevents relatching after hang up in latching detectors.

The high impedance relay ring detector (and the other detectors herein) is applicable to telephone answering sets, to voice connecting arrangements (Bell System type) and other apparatus, with the advantages of reduced switching, elimination of some relay contacts or relays, reduction in cost and substantial improvement in reliability.

These circuits employ an input coupling circuit where a d.c. blocking capacitor couples one side of the telephone line to the remainder of the circuit; or a resistor or transformer or both may be included in the input coupling circuit. A second d.c. blocking capacitor or the blocking capacitor and the primary of the transformer may be used to isolate the detector from the telephone line.

The capacitor (or capacitor-resistor) or transformer secondary may connect directly to a semiconductor or first to a rectifier-R-C delay circuit and then to a semiconductor. The rectifier may be single, full-wave, bridge or like configurations. The semiconductor may be a transistor, relaxation oscillator or latching semiconductor. In other circuits, the capacitor-rectifier or capacitor-rectifier-transformer feeds either the coil of a high sensitivity relay or R-C delay means and then the coil of a high sensitivity relay.

The semiconductor may be a three terminal transistor, a two or three terminal relaxation oscillator, a thyristor or latching multivibrator or the like. A "latching semiconductor switch" refers to a thyristor, SCR, PNP-NPN transistor regenerative pair, Dynaquad, bistable multivibrator, monostable multivibrator (one-shot self-commutating), transistor actuated latching relay and the like.

These circuits are adapted for use with telephone answering sets, telephone data transmission terminals, voice connecting arrangements, call diverters, local ringers, multi-key telephone sets, and like telephone apparatus.

While common emitter transistor circuits are described, common base and common collector circuits are possible. Darlington transistor pairs are intended to be defined within the word transistor.

Time delay means may be R-C delay means, thermistor delay resistors, thermal delay switches and the like. The word transformer will include an autotransformer with a common primary and secondary.

A transformer is two coils, a primary and a secondary, both wound about a common magnetic core in inductive relation so that an alternating current field developed in one coil is induced into the other coil.

In the claims, "voltage responsive means" refers to the semiconductors that latch, oscillate or conduct when a ring signal appears, as shown in the figures and includes a high impedance, high sensitivity relay detector taught herein.

The definition of "commutating means" for thyristors and the like given in U.S. Pat. No. 3,794,764 applies here including (1) capacity commutation in a flip-flop or d.c. static switch arrangement, (2) current interruption, for example by cutting off current in a normally on transistor in series with a thyristor, (3) shorting gate to cathode of a thyristor or Dynaquad or applying a negative bias to a thyristor gate as a "gate turn off switch", (4) commutation of a transistor analog complementary pair of shorting appropriate points of the circuit, (5) capacity commutation of a thyristor by substituting a switch for the commutating thyristor in the flip-flop arrangement, (6) momentary shorting of anode to cathode of a conducting thyristor, and the like.

"Time delay means" includes R-C time delay means, thermal delay switches and the like. "R-C delay means" is defined as a circuit containing resistance and capacitance that when connected to a d.c. voltage source such as the output of a rectifier fed by an AC source, charges a capacitor exponentially through its circuit resistance causing the voltage across the capacitor to rise and slowly to approach the applied voltage, producing a time delay; in this invention time delay is a minimum of several cycles of ringing voltage and may be made to be several ring bursts or such time as the user may desire to permit the user time to respond to the call, for example before the telephone answering set causes line seizure.

It is seen that the modules and circuits taught may be interchanged and combined in may ways in different circuits; equivalent circuits may be substituted for the modules and immaterial limitations of the circuits and modules omitted, without varying from or departing from the spirit of this invention. Minor or immaterial modifications which are not strictly defined herein or in the letter of the claims may nonetheless be covered by the patent and the inventive concept.

I claim:

1. A ring signal detector for a telephone line in which a ringing voltage appears, having zero d.c. drain from said telephone line for actuating associated apparatus with a direct current produced when said ringing voltage appears comprising a blocking capacitor, a rectifier having an input and an output, R-C delay means having an input and an output, a transistor having a base, an emitter and a collector, a load impedance and a power source, said capacitor and said input of said rectifier connected in series across said telephone line, said output of said rectifier connected to said input of said R-C delay means, said output of said R-C delay means connected to said base and said emitter, said load impedance and said collector and said emitter connected in series across said power source, said ringing voltage appearing and being divided into a first voltage across said capacitor and a second voltage across said input of said rectifier, said second voltage being rectified, said rectified voltage being applied from said output of said rectifier to said input of said R-C delay means; after a time delay, said rectified voltage being applied by said output of said R-C delay means to said base and said emitter rising to a level sufficient to cause said transistor to conduct, causing current flow from said power source through said collector and said emitter and said load impedance, said load impedance comprising said associated apparatus, said direct current flow actuating said associated apparatus.

2. A ring signal detector for a telephone line in which a ringing voltage appears having zero d.c. drain current from said telephone line for actuating associated apparatus with a direct current produced when said ringing voltage appears comprising a blocking capacitor, a transformer having a primary, a secondary, and a common magnetic core, said primary and said secondary wound in inductive relation about said magnetic core, a rectifier having an input and an output, R-C delay means having an input and an output, a transistor having a base, an emitter and a collector, a power source and a load impedance, said capacitor and said primary connected in series across said telephone line, said secondary connected to said input of said rectifier, said output of said rectifier connector to said input of said R-C delay means, said output of said R-C delay means connected to said base and said emitter, said power source, said load impedance and said collector and said emitter connected in series, said ringing voltage appearing and being divided into a first voltage across said capacitor and a second voltage across said primary, said second voltage being transformed and appearing at said secondary; said transformed voltage being rectified by said rectifier and then applied by said output of said rectifier to said input of said R-C delay means; after a time delay, said rectified voltage being applied by said output of said R-C delay means to said base and said emitter, rising to a level sufficient to cause said transistor to conduct and causing current flow from said power source through said collector and said emitter and said load impedance, said load impedance comprising said associated apparatus, said direct current flow actuating said associated apparatus.

3. A ring signal detector for a telephone line in which a ringing voltage appears having zero d.c. drain current from said telephone line for actuating associated apparatus with a direct current produced when said ringing voltage appears comprising a blocking capacitor, a transformer having a primary, a secondary, and a common magnetic core, said primary and said secondary wound in inductive relation about said magnetic core, a transistor having a base, an emitter and a collector, a power source and a load impedance, said capacitor and said primary connected in series across said telephone line, said secondary connected to said base and said emitter, said load impedance and said collector and said emitter connected in series across said power source, said ringing voltage appearing in said telephone line and being divided into a first voltage across said capacitor and a second attenuated voltage across said primary, said second voltage being transformed, appearing in said secondary and being applied to said base and said emitter, causing said transistor to conduct and current to flow from said power source through said collector and said emitter and said load impedance, said load impedance comprising said associated apparatus, said direct current flow actuating said associated apparatus.

4. A ring signal detector for a telephone line in which a ringing voltage appears for actuating associated apparatus comprising a blocking capacitor, a transformer having a primary, a secondary, and a common magnetic core, said primary and said secondary wound in inductive relation about said magnetic core, a rectifier having an input and an output, R-C delay means having an input and an output, a thyristor having a control element and two current conducting terminals, a power source, a load impedance, said load impedance comprising said associated apparatus, isolating means having an input and an output to prevent reverse current flow from said control element to said output of said R-C delay means, and commutating means having two output terminals, said means when actuated reducing momentarily current flow in said thyristor to below the holding current of said thyristor, said capacitor and said primary connected in series across said telephone line, said secondary connected to said input of said rectifier, said output of said rectifier connected to said input of said R-C delay means, said input of said isolating means connected to said output of said R-C delay means, said output of said isolating means connected to said control element and one of said current conducting terminals, said current conducting terminals and said load impedance connected in a series circuit with said power source, said two terminals of said commutating means connected to two points within said series circuit, said ringing voltage appearing and being divided into a first voltage across said capacitor and a second voltage across said primary, said second voltage being transformed and appearing at said secondary; said transformed voltage being rectified by said rectifier, said rectified voltage traversing said R-C delay means and said isolating means and being applied to said control element and said one of said current conducting terminals after a delay causing said thyristor to go to said latched condition causing current flow from said power source through said current conducting terminals and said load impedance, said current flow actuating said associated apparatus, said commutating means subsequently given an actuating impulse causing said current flow in said thyristor to be reduced to below holding current and said thyristor to unlatch and to be restored to said unlatched condition, said current flow ceasing.

5. In claim 1, a resistor, said resistor in series with said capacitor and said rectifier across said telephone line, said ringing voltage being additionally divided into s third voltage, said third voltage appearing across said resistor.

6. In claim 2, a resistor, said resistor in series with said capacitor and said primary across said telephone line, said ringing voltage being additionally divided into a third voltage, said third voltage appearing across sadi resistor.

7. In claim 3, a resistor, said resistor in series with said capacitor and said primary across said telephone line, said ringing voltage being additionally divided into a third voltage, said third voltage appearing across said resistor.

8. A ring signal detector for a telephone line in which a ringing voltage appears for actuating associated apparatus with a current produced when said ringing voltage appears comprising a blocking capacitor, a rectifier having an input and an output, R-C delay means having an input and an output, a relaxation oscillator and a load impedance, said capacitor and said input of said rectifier connected in series across said telephone line, said output of said rectifier connected to said input of said R-C delay means, said output of said R-C delay means connected to said relaxation oscillator, said relaxation oscillator connected in series with said load impedance, a ringing voltage appearing in said telephone line being applied to said rectifier and being rectified; said rectified voltage then being applied by said output of said rectifier to said input of said R-C delay means; after a delay, said voltage appearing at said output of said R-C delay means being applied to said relaxation oscillator; said voltage then causing said relaxation oscillator to oscillate and at least one pulse to appear in said load impedance, said associated apparatus comprising a succeeding semiconductor having a control element and two current conducting terminals, said control element and one of said two current conducting terminals connected to said load impedance, said pulses actuating said succeeding semiconductor.

9. A ring signal detector for a telephone line in which a ringing voltage appears for actuating associated apparatus with a current produced when said ring voltage appears comprising a blocking capacitor, a transformer having a primary, a secondary, and a common magnetic core, said primary and said secondary wound in inductive relation about said magnetic core, a rectifier having an input and an output, R-C delay means having an input and an output, a relaxation oscillator and a load impedance, said capacitor and said primary connected in series across said telephone line, said secondary connected to said inut of said rectifier, said output of said rectifier connected to said input of said R-C delay means, said output of said R-C delay means connected to said relaxation oscillator, said relaxation oscillator connected in series with said load impedance; a ringing voltage appearing in said telephone line being transformed, applied to said rectifier and being rectified; said rectified voltage being applied by said output of said rectifier to said input of said R-C delay means; after a time delay, said rectified voltage apperating at said output of said R-C delay means and being applied to said relaxation oscillator; said voltage causing said relaxation oscillator to oscillate and at least one pulse to appear in said load impedance, said associated apparatus comprising a succeeding semiconductor having a control element and two current conducting terminals, said control element and one of said two current conducting terminals connected to said load impedance, said pulses actuating said succeeding semiconductor.

10. A ring signal detector for a telephone line in which a ringing voltage appears for actuating associated apparatus comprising a blocking capacitor, ringing voltage responsive means having an input and an output, time delay means having an input and an output, a latching semiconductor switch having an unlatched condition and a latched condition, said latching semiconductor switch having input actuating terminals and output current conducting terminals, a lamp comprising said associated apparatus, a power source and commutating means having two terminals, said means when actuated causing said latching semiconductor switch, when in said latched condition to be restored to said unlatched condition; said capacitor and said input of said ringing voltage responsive means connected in series across said telephone line, said output of said ringing voltage responsive means connected to said input of said time delay means, said output of said time delay means connected to said input actuating terminals of said latching semiconductor switch; said lamp, said current conducting terminals of said latching semiconductor switch and said power source connected in a series circuit, said two terminals of said commutating means connected to two points within said circuit and said latching semiconductor switch; a ringing voltage appearing in said telephone line coupled by said capacitor to said input of said ringing voltage responsive means, said output of said ringing voltage responsive means actuating said time delay means; after a delay, said output of said time delay means applied to said input terminals of said latching semiconductor switch, actuating said latching semiconductor switch into said latched condition, and causing current to flow from said power source through said latching semiconductor switch and said lamp, lighting said lamp; said commutating means when actuated causing said latching semiconductor switch to restore to said unlatched condition and said lamp to be extinguished.

11. A ring signal indicator for a telephone line in which a ringing voltage appears comprising means responsive to said ringing voltage, said means having an input and an output, a latching semiconductor switch having an unlatched condition and a latched condition, said latching semiconductor switch having input actuating terminals and output current conducting terminals, a lamp, a power source and commutation means, said telephone line connected to said input of said means responsive to said ringing voltage, said output of said means connected to said input actuating terminals of said latching semiconductor switch; said lamp, said output current conducting terminals of said latching semiconductor switch and said power source connected in series, said commutating means connected to two terminals of said latching semiconductor switch; a ringing voltage appearing in said telephone line actuating said means responsive to said ringing voltage, said means then applying an actuating voltage to said input actuating terminals, actuating said latching semiconductor switch to said latched condition, causing current to flow from said power source through said latching semiconductor switch and said lamp, lighting said lamp; said commutating means when actuated causing said latching semiconductor switch to restore to said unlatched condition and said lamp to be extinguished.

12. A ring signal detector for a telephone line in which a ringing voltage appears for actuating associated apparatus comprising a blocking capacitor, a rectifier having an input and an output, R-C delay means having an input and an output a thyristor having a control element and two current conducting terminals, a load impedance, said load impedance comprising said associated apparatus, a power source, isolating means having an input and an output to prevent reverse current flow from said control element to said output of said R-C delay means, and commutating means having two output terminals, said means when actuated reducing momentarily current flow in said thyristor to below the holding current of said thyristor, said capacitor and said input of said rectifier connected in series across said telephone line, said output of said rectifier connected to said input of said R-C delay means, said input of said isolating means connected to said output of said R-C delay means, said output of said isolating means connected to said control element and one of said current conducting terminals, said load impedance, said two current conducting terminals and said power source connected in a series circuit, said two terminals of said communtating means connected to two points within said series circuit, a ringing voltage appearing in said telephone line being divided into a first voltage across said capacitor and a second voltage across said input of said rectifier, said second voltage being rectified, said rectified voltage being applied by said output of said rectifier to said input of said R-C delay means, said rectified ringing voltage traversing said R-C delay means and said isolating means and being applied to said control element and said one of said current conducting terminals after a delay causing said thyristor to go into said latched condition and causing current flow from said power source through said current conducting terminals and said load impedance, said current flow actuating said associated apparatus, said commutating means subsequently given an actuating impulse causing said current flow in said thyristor to be reduced to below holding current and said thyristor to unlatch and to be restored to said unlatched condition, said current flow ceasing.

13. A ring signal detector for a telephone line in which a ringing voltage appears for actuating associated apparatus comprising a blocking capacitor, a rectifier, R-C delay means having an input and an output, a unijunction transistor having a control element and two current conducting terminals, a load impedance and a power source, said capacitor and said rectifier connected in series across said telephone line, said rectifier connected to said input of said R-C delay means, said output of said R-C delay means connected to said control element and one of said current conducting terminals; said load impedance, said two current conducting terminals and said power source connected in series; a ringing voltage appearing in said telephone line being rectified by said rectifier and going to said input of said R-C delay means; said rectified voltage being applied by said output of said R-C delay means to said control element and said one of said current conducting terminals, after a delay, said voltage rising to a level sufficient to cause said unijunction transistor to oscillate, producing pulses, said pulses flowing from said power source through said current conducting terminals and said load impedance, said load impedance comprising said associated apparatus, said pulses actuating said associated apparatus.

14. A ring signal detector for a telephone line in which a ringing voltage appears for actuating associated apparatus comprising a blocking capacitor, a transformer having a primary, a secondary, and a common magnetic core, said primary and said secondary wound in inductive relation about said magnetic core, a rectifier, R-C delay means having an input and an output, a unijunction transistor having a control element and two current conducting terminals, a power source and a load impedance, said capacitor and said primary in series across said telephone line, said secondary connected to said rectifier, said rectifier connected to said input of said R-C delay means, said output of said R-C delay means connected to said control element and one of said current conducting terminals, said power source, said load impedance and said two current conducting terminals connected in series, a ringing voltage appearing in said telephone line applied to said primary, said voltage appearing at said secondary being rectified by said rectifier and going to said input of said R-C delay means; said rectified voltage being applied by said output of said R-C delay means to said control element and said one of said current conducting terminals; after a delay, said voltage rising to a level sufficient to cause said unijunction transistor to oscillate, producing pulses, said pulses flowing from said power source through said current conducting terminals and said load impedance, said load impedance comprising said associated apparatus, said pulses actuating said associated apparatus.

15. In claim 8, a resistor, said resistor in series with said capacitor and said rectifier across said telephone line 16. In claim 9, a resistor, said resistor in series with said capacitor and said primary across said telephone line.

* * * * *